United States Patent [19]
Jaag

[11] Patent Number: 6,000,964
[45] Date of Patent: Dec. 14, 1999

[54] FASTENING DEVICE FOR A TERMINAL CONNECTOR IN A CABLE CONDUIT

[75] Inventor: Dieter Jaag, Villingen-Schwenningen, Germany

[73] Assignee: BTR Blumberger Telefon-und Relaisbau Albert Metz, Germany

[21] Appl. No.: 09/030,969

[22] Filed: Feb. 26, 1998

[30] Foreign Application Priority Data

Feb. 28, 1997 [DE] Germany ..................... 297 03 641 U

[51] Int. Cl.⁶ .................................................. H01R 13/60
[52] U.S. Cl. ........................................ 439/532; 439/527
[58] Field of Search ................................ 439/527, 528, 439/529, 532, 533, 587, 516, 716, 721

[56] References Cited

U.S. PATENT DOCUMENTS

| | | | |
|---|---|---|---|
| 3,454,836 | 7/1969 | Norden | 439/532 |
| 4,073,563 | 2/1978 | Bailey et al. | 439/532 |
| 5,116,262 | 5/1992 | Marton et al. | 439/709 |
| 5,192,227 | 3/1993 | Bales | 439/532 |
| 5,704,805 | 1/1998 | Douty et al. | 439/532 |

*Primary Examiner*—Lincoln Donovan
*Attorney, Agent, or Firm*—Eugene E. Renz, Jr. PC

[57] ABSTRACT

A holder device for fastening a terminal connector 20 in a cable conduit 10 comprising a generally U-shaped strap having a yoke 22 and sidepieces 24 projecting from the ends of the yoke 22, said installed yoke 22 being seated on the bottom 12 of the conduit 10 and extending in the longitudinal direction of the conduit 10 whereby the terminal connector 20 can be attached to the free ends 36 of the sidepieces 24.

6 Claims, 2 Drawing Sheets

FASTENING DEVICE FOR A TERMINAL CONNECTOR IN A CABLE CONDUIT

BACKGROUND OF THE INVENTION

Cable conduits are used for a variety of purposes. For example, cable conduits are used in the installation of power cables, data cables and telecommunications cables in buildings and the like. In these applications, terminal connectors are installed in the cable conduit so that the terminal units can be connected at the desired locations to the cable laid in the cable conduit.

Holders for securing the terminal connectors securely in place in the cable conduit are known in the prior art. These holders are attached to the bottom of the cable conduit so that they project up from the bottom. The holding elements of the holding mechanism are designed as closed cups made of plastic into which the terminal connector is placed. More specifically, the terminal connector is fastened to the upper edge of the cup, for example, by means of a support ring or support tabs on the connector screwed to the cup edge. The cups are provided with openings so that the cable laid in the cable conduits can be passed through to the desired terminal connector. In other words, the cup openings allow the cable to pass into the cup and thus to the terminal connector. It has been found that this installation process has certain disadvantages and drawbacks, particularly when the cables are very stiff and must be passed with relatively short bending radii through the openings in the cup-like holders.

SUMMARY OF THE INVENTION

With the foregoing in mind, it is an object of the present invention to provide an improved fastening device or holder for the attachment of terminal connectors in a cable conduit characterized by novel features of construction and arrangement making it easier to install and connect the terminal connector. To this end, the holder is designed as a U-shaped strap consisting of a yoke and two sidepieces which are molded into the ends of the yoke whereby when the holder is installed, the yoke is seated on the bottom of the conduit and extends in the longitudinal direction of the conduit whereby the terminal connector can be attached of the free ends of the sidepieces.

The basic idea of the present invention is to design the holder as a U-shaped strap which is fastened in the cable conduit in such a way that its plane extends in the longitudinal direction of the cable conduit. The holder is fastened to the cable conduit with its yoke resting on the bottom so that the two sidepieces of the U-shaped holder project up at right angles from the bottom of the cable conduit. The terminal connector can then be inserted between the two sidepieces of the holder and attached to the free ends of the sidepieces. By this arrangement, the terminal connector is freely accessible from both sides so that the cables laid in the cable conduit can be easily connected to the terminal connector. The cable ends to be connected can be clamped to the terminal connector while they are still outside the cable conduit. Thereafter, the terminal connector is placed in the holder and fastened in place. Thus, the connected cables can be laid freely in the cable conduit without impeding the insertion of the terminal connectors in the holder.

It is preferable to insert the cup-like half-shells into the holder by attaching them to the sidepieces. Most preferably they are pushed into guideways on the sidepieces. Each of the inserted cup half-shells seals off one side of the terminal connector installed in the holder. Accordingly, the terminal connector can be shielded if necessary from other cables in the conduit passing by the terminal connector but not connected to it by reason of the inserted cup half-shells. If necessary, the cup half-shells can be used only on one of the two sides of the holders are on both sides.

In accordance with a specific feature of the invention, the holders can be aligned in a row in the longitudinal direction of the cable conduit. By this arrangement, it is possible to install several terminal connectors next to one another at the given modular dimension.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
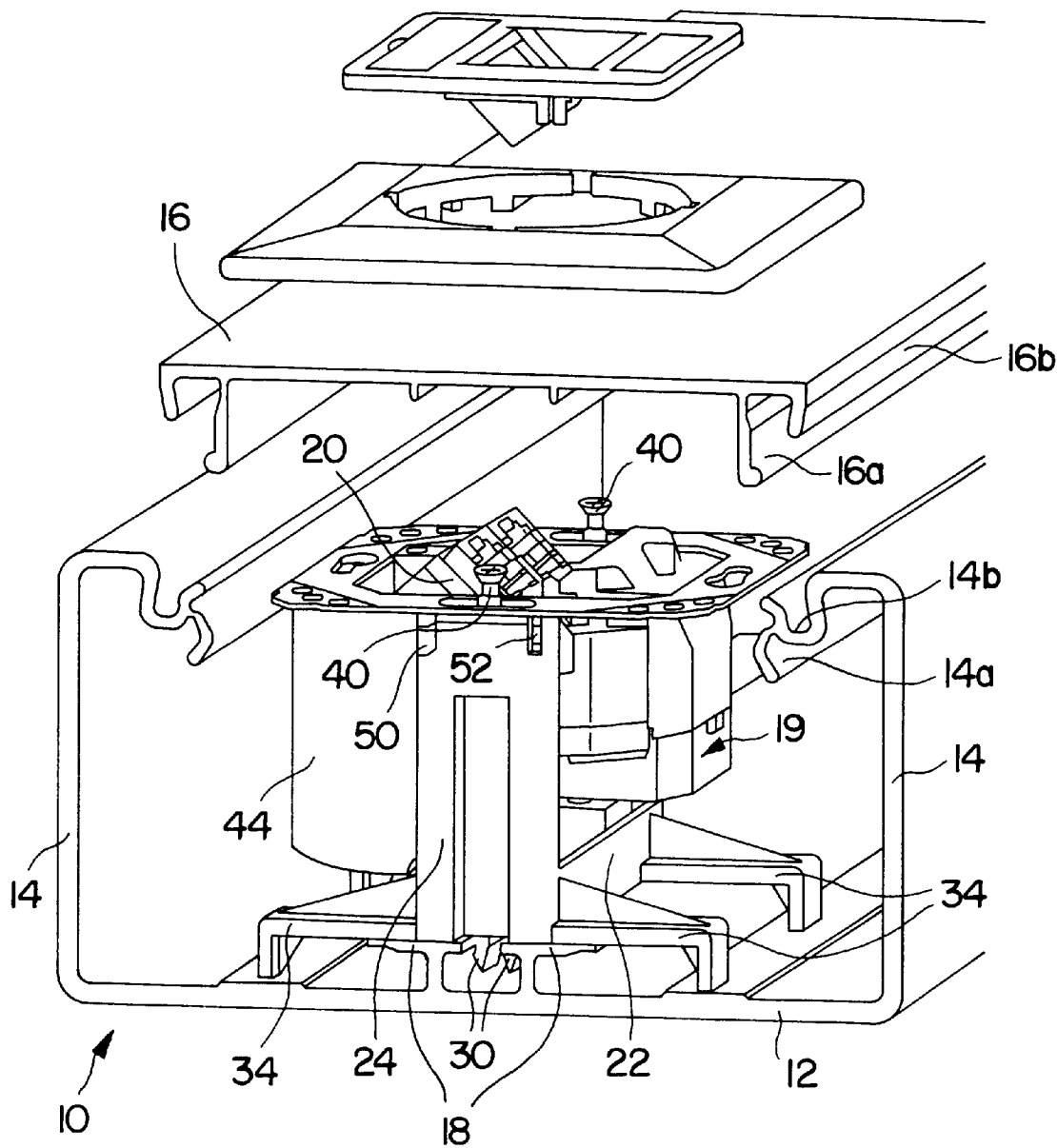
FIG. 1 is a perspective view of the cable conduit showing a holder in accordance with the present invention and a terminal connector inserted in the holder.

Referring now to the drawings and particularly to FIG. 1 thereof, there is shown a cable conduit generally designated by the numeral 10 which is preferably made of plastic and is of a U-shaped configuration comprising a generally rectangular bottom 12 having elongated, upstanding sidewalls or sidepieces 14 extending upwardly from the outer side edges of the bottom 12. The sidepieces 14 are of a configuration to define a locking configuration for a cover 16 comprising an elongated, depending flanges 14a, 16a and a upwardly facing elongated groove 14b. The cover 16 is generally rectangular cover having a pair of longitudinally extending, depending flanges 16b designed to snap-fit over the shaped locking configuration of the sidepieces 14 in the manner shown in FIG. 1.

An elongated profile 18 is mold onto the inside surface of bottom 12, extending in the longitudinal direction of cable conduit 10. This profile 18 as shown consists of side by side T-shaped sections wherein the adjacent crosspieces 18a are spaced apart to form a groove 21, which is undercut on both sides. Terminal connectors 20 of a data or telecommunications network are laid in cable conduit 10, and fastened in cable conduit 10 by means of a holder, generally designated by the numeral 19.

The holder is designed as a U-shape strap, preferably injection-molded of plastic. The holder has a yoke 22, on the two ends of which sidepieces 24 are molded, which project up at a right angle. When the holder is inserted in cable conduit 10, yoke 22 rests on profile 18 and extends in the longitudinal direction of profile 18. Receptacles 26 are mounted on the bottom surface of yoke 22 one at each end which are open toward profile 18. A clamping device 28 is inserted into each of these receptacles 26. Each clamping device has two latching looks 30, which can be spread apart from each other. When yoke 22 is set down onto profile 18, latching hooks 30 engage in the undercut groove 18a of profile 18. A screw 32 passes from the top surface of yoke 22 through yoke 22 to engage a threaded nut 28a of clamping device 28 and ends up between latching looks 30. Screw 32 thus holds clamping device 28 permanently in the holder. After latching hooks 30 of clamping 28 have been inserted into the groove $18_a$ in profile 18, screw 32 is tightened, and thus its free end moves down between latching hooks 30 and spreads them out. Latching hooks 30 thus lock into the undercuts of the groove of profile 18, as a result of which yoke 22 and the holder itself are permanently clamped to profile 18 and thus held securely in cable conduit 10.

Extension arms 34, furthermore, project out at right angles toward both sides from the two ends of yoke 22. Extension arms 34 are parallel to bottom 12 of cable conduit 10 and are supported on bottom 12 by their ends, which are bent over at an angle to face the bottom. The holder is thus supported in cable conduit 10 by extension arms 34 in such a way that it cannot be tipped over.

A thick block 36 is molded on each of the upper free ends of sidepieces 24 of the holder. Each block 36 is provided with a hole $36_a$ parallel to sidepieces 24. To attach a terminal connector 20 to the holder, the terminal connector 20 is placed between sidepieces 24, and the support ring or support tabs $24_a$ of the connector are seated on blocks 36 of sidepieces 24. The support ring or support tabs $24_a$ are fastened by means of screws 40, which are screwed into the holes $36_a$.

Figure 2:
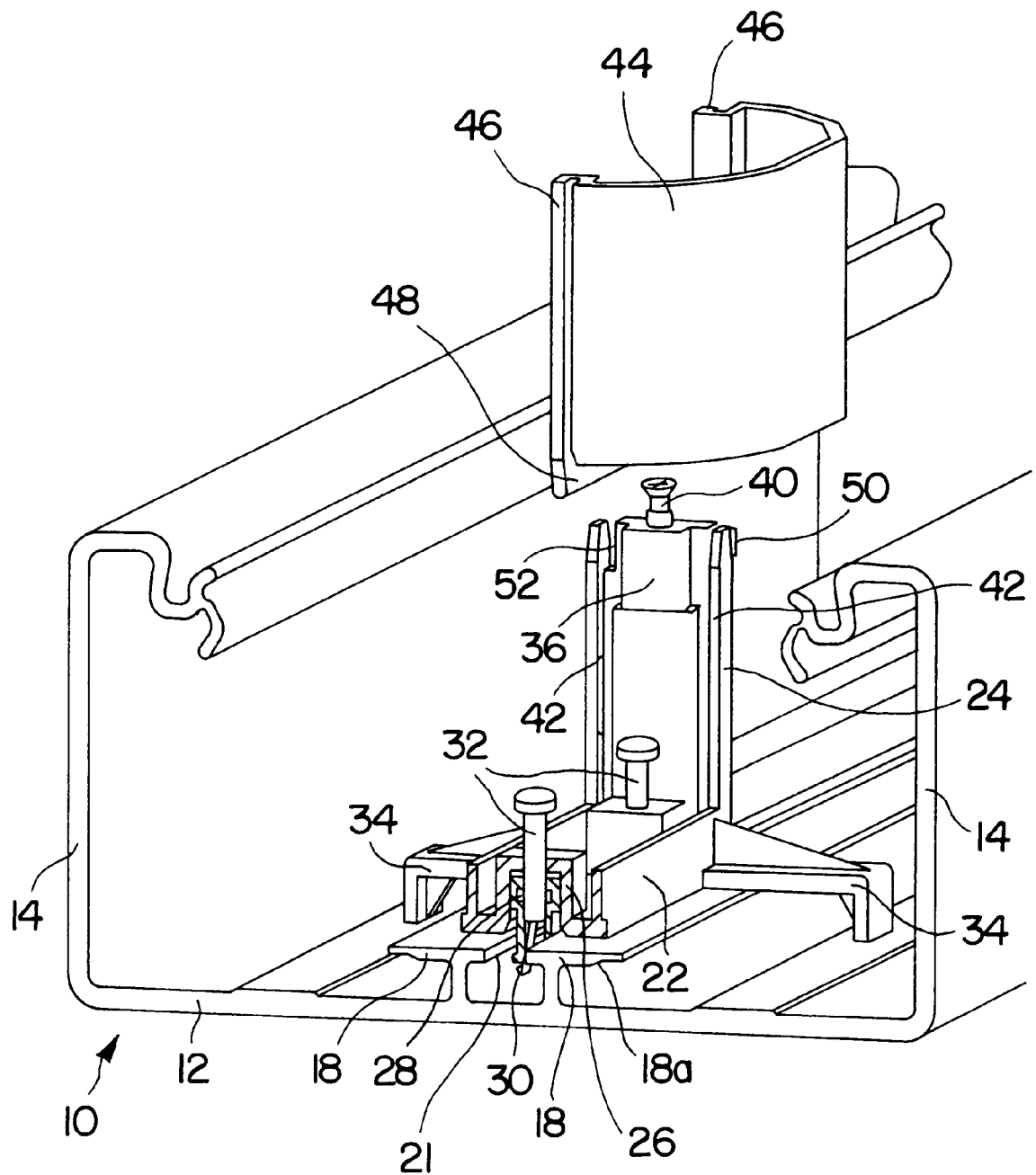
FIG. 2 is a perspective view with a partially cutaway holder so that details may be seen more clearly.

As illustrated in FIG. 2, sidepieces 24 have a guide groove 42 along each of their two outside edges. These grooves 42 are open at the free end of sidepieces 24 and extend over the entire length of sidepieces 24. If necessary, cup-like half-shells 44 made of plastic can be inserted into these guide grooves 42 to cover one or both sides of terminal connector 20 after it has been inserted into the holder. Cup half-shells 44 have a semi-cylindrical wall $44_a$ and a closed bottom $44_b$. Guide rails 46 are provided along the longitudinal edges of the semi-cylindrical wall $44_a$. Upon insertion of cup half-shells 44 in the holder, these rails engage in guide grooves 42 in sidepieces 24. In addition, a projecting bottom rail 48 is also molded on the free edge of the bottom of cup half-shells 44. This rail engages in corresponding recesses $22_a$ in the top of yoke 22 to provide additional security against the topping of cup half-shells 44 in the holder.

If necessary, a cup half-shell 44 can be placed on the one or the other side of the holder or on both sides of the holder before terminal connector 20 is inserted. As soon as terminal connect 20 has been inserted and seated by its support ring or support tabs on block 36 and fastened down by means of screws 40, the support ring or support tabs 24a block the open, upper end of guide grooves 42, so that cup half-shells 44 are fixed in place in guide grooves 42 and thus to sidepieces 24.

At the upper, free end of each sidepiece 24 there is a projection 50, which extends outwardly and which is off-center with respect to the longitudinal center plane P—P of the holder. A receptacle 52, which corresponds to projection 50 and is a mirror image of it with respect to the longitudinal central plane P—P, is also provided on the free end of each sidepiece 24. When several holders are mounted next to each other in a row in cable conduit 10, the outside surfaces of sidepieces 24 of the adjacent holders rest against each other so that a projection 50 of one holder engages in a receptacle 52 of the next holder, alternating thus from side to side. Thus, it is ensured that the sidepieces 24 of the holders resting against each other do not shift laterally with respect to one another and that terminal connectors 20 inserted in the holders are installed with the exact modular dimension between them.

Even though a particular embodiment of the invention has been illustrated and described herein, it is not intended to limit the invention and changes and modifications may be made therein within the scope of the following claims.

What is claimed is:

1. A holder device for fastening a terminal connector 20 in a cable conduit 10, comprising a generally U-shaped strap defined by a yoke 22 and sidepieces 24 projecting from the ends of the yoke 22, said yoke 22 adapted to seated on the bottom 12 of the conduit 10 and extending in the longitudinal direction of the conduit 10 whereby the terminal connector 20 can be attached to the free ends 36 of the sidepieces 24;

said yoke 22 adapted to be clamped to a profile 18 which extends in the longitudinal direction of the cable conduit 10 and which is molded to the bottom 12 of the cable conduit 10 having said yoke 22 at least two clamping devices 28, which are offset from one another in the longitudinal direction; and said profile 18 having a groove 18a which is undercut on both sides, and wherein said clamping device 28 has latching hooks 30, which can be spread apart to engage in the undercut groove, each of the clamping devices 28 being permanently attached by means of a screw 32 to the yoke 22 wherein said screw 32 can be turned to extend down between the latching hooks 30 to spread them apart.

2. A holder device according to claim 1 including at least two extension arms 34, which project in opposite directions perpendicularly from the yoke 22 and which are supported against the bottom 12 of the cable conduit 10.

3. A holder device according to claim 1, including cup half-shells 44 removably attached to the sidepieces 24 on both sides of the holder device.

4. A holder device according to claim 3, wherein guideways 32 are provided on the sidepieces 24, extending in the longitudinal direction of the sidepieces and wherein said cup half-shells 44 are provided with corresponding guide parts 46 to slidingly engage in the guideways 32.

5. A holder device according to claim 4, wherein after the cup half-shells 44 have been slid into the guideways 42 they are held in place by the attached terminal connector 20.

6. A holder device according to claim 1 including interengaging projections 50 and receptacles 52, on the outside surface of the sidepieces 24 whereby the holder devices of a contiguous row installed in the cable conduit 10 can engage with each other.

* * * * *